United States Patent
Pogorelik (10) Patent No.: US 10,522,053 B2
(45) Date of Patent: Dec. 31, 2019

(54) SPEECH CLARITY SYSTEMS AND TECHNIQUES

(71) Applicant: Intel Corporation, Santa Clara, CA (US)

(72) Inventor: Oleg Pogorelik, Lapid (IL)

(73) Assignee: Intel Corporation, Santa Clara, CA (US)

( * ) Notice: Subject to any disclaimer, the term of this patent is extended or adjusted under 35 U.S.C. 154(b) by 742 days.

(21) Appl. No.: 15/085,461

(22) Filed: Mar. 30, 2016

(65) Prior Publication Data

US 2017/0287355 A1    Oct. 5, 2017

(51) Int. Cl.
  *G09B 19/04* (2006.01)
  *G10L 15/26* (2006.01)
  *G09B 5/02* (2006.01)

(52) U.S. Cl.
  CPC ............ *G09B 19/04* (2013.01); *G09B 5/02* (2013.01); *G10L 15/26* (2013.01)

(58) Field of Classification Search
  CPC ............ G09B 19/04; G09B 5/02; G10L 15/26
  See application file for complete search history.

(56) References Cited

U.S. PATENT DOCUMENTS

| | | | | |
|---|---|---|---|---|
| 9,223,830 B1* | 12/2015 | Dzik | | G06F 16/24578 |
| 2003/0154072 A1* | 8/2003 | Young | | H04M 3/51 |
| | | | | 704/9 |
| 2006/0100852 A1* | 5/2006 | Gamon | | G06F 17/271 |
| | | | | 704/9 |
| 2007/0005754 A1* | 1/2007 | Horvitz | | H04L 12/1813 |
| | | | | 709/224 |
| 2009/0012794 A1* | 1/2009 | van Wijngaarden | ... | G10L 25/48 |
| | | | | 704/270 |
| 2009/0157714 A1* | 6/2009 | Stanton | | G06F 17/21 |
| 2010/0153425 A1* | 6/2010 | Tulchinsky | | G09B 19/04 |
| | | | | 707/765 |
| 2012/0123767 A1 | 5/2012 | Ananthanarayanan | | |
| 2014/0067375 A1* | 3/2014 | Wooters | | G06F 17/28 |
| | | | | 704/9 |
| 2014/0141392 A1* | 5/2014 | Yoon | | G09B 5/04 |
| | | | | 434/156 |
| 2014/0297279 A1* | 10/2014 | Miller | | G09B 21/009 |
| | | | | 704/235 |

(Continued)

FOREIGN PATENT DOCUMENTS

WO    WO-2017172111 A1    10/2017

OTHER PUBLICATIONS

"International Application Serial No. PCT/US2017/018661, International Search Report dated May 30, 2017", 3 pgs.

(Continued)

*Primary Examiner* — Corbett B Coburn (74) *Attorney, Agent, or Firm* — Schwegman Lundberg & Woessner, P.A.

(57) ABSTRACT

Embodiments of a system and method for improving conference call speech clarity are generally described herein. A method may include receiving presenter speech from a presenter to be cast to one or more participants. The method may include transcribing the speech to text and determining a readability score of the text. The method may include displaying the readability score, using a speech clarity indicator, to the presenter used as a metric to gauge participants' understanding.

24 Claims, 6 Drawing Sheets

(56) References Cited

U.S. PATENT DOCUMENTS

2015/0195406 A1* 7/2015 Dwyer ............... H04M 3/5175
379/265.07
2017/0125014 A1* 5/2017 Pogorelik ............... G10L 17/24

OTHER PUBLICATIONS

"International Application Serial No. PCT/US2017/018661, Written Opinion dated May 30, 2017", 7 pgs.
Flesch, Rudolf, "A New Readability Yardstick", Journal of Applied Psychology, vol. 32, No. 3, (Jun. 1948), 221-233.

\* cited by examiner

SPEECH CLARITY SYSTEMS AND TECHNIQUES

BACKGROUND

Users on phone calls, such as conference calls, often have communication issues. The idea that a user is attempting to express is not always understood as intended once the user starts trying to communicate the idea. This type of misunderstanding may lead to unintended consequences or results. Clear communication is a crucial success factor for people involved in day-to-day conferencing and collaboration. While talking to listeners live, it is often easier for a speaker to see and correct misunderstandings. Unfortunately in remote sessions, a speaker is relatively isolated and may "miss the audience" or fail to get a point across. Solutions aimed at solving this issue, such as tracking peers emotions using face recognition (i.e., using video capture), suffer from low accuracy, privacy issues, and processing delays. Similarly, other solutions, such as relying on listeners to interrupt the speaker to tell the speaker that the speech is unclear, have low accuracy and are limited to a listener's ability to notify the speaker that there has been a misunderstanding.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for improving conference call speech clarity are described herein. The systems and methods described herein may provide a speaker with a simple and reliable way of controlling a clarity level of the speaker's speech while communicating remotely. The systems and methods described herein provide a solution that avoids some of the complications of existing techniques by not using a camera. The peer-to-peer interaction may be avoided, if desired, which may reduce delays and eliminate privacy concerns. Privacy issues are eliminated when peer interaction is not present, and they may be reduced when peer interaction is used, as use of a camera may be avoided. The systems and methods described herein offer reliability as they utilize objective parameters rather than emotions of a subject. For example, the reliability includes readability calculating techniques that depend on content parameters. In an example, the systems and methods described herein may work off-line or in real-time. For example, speech clarity may be improved by monitoring it during trainings or recorded lectures, etc. or during live conference calls.

The problems of misunderstanding a speaker exist in remote communication and in direct in-person communication, such as for a lecturer or business presenter. For example, a presenter may use too much jargon or terms of art for a wider audience. The systems and methods described herein may be applied for direct in-person communication. For example, a lecturer running a course in a class may keep a microphone of a laptop open and see a clarity indicator while speaking. In another example, a business presenter may be giving a presentation, such as a sales presentation, presentation at a board meeting, corporate meeting, etc., and may view a clarity indicator on a personal device while giving the presentation.

Figure 1:
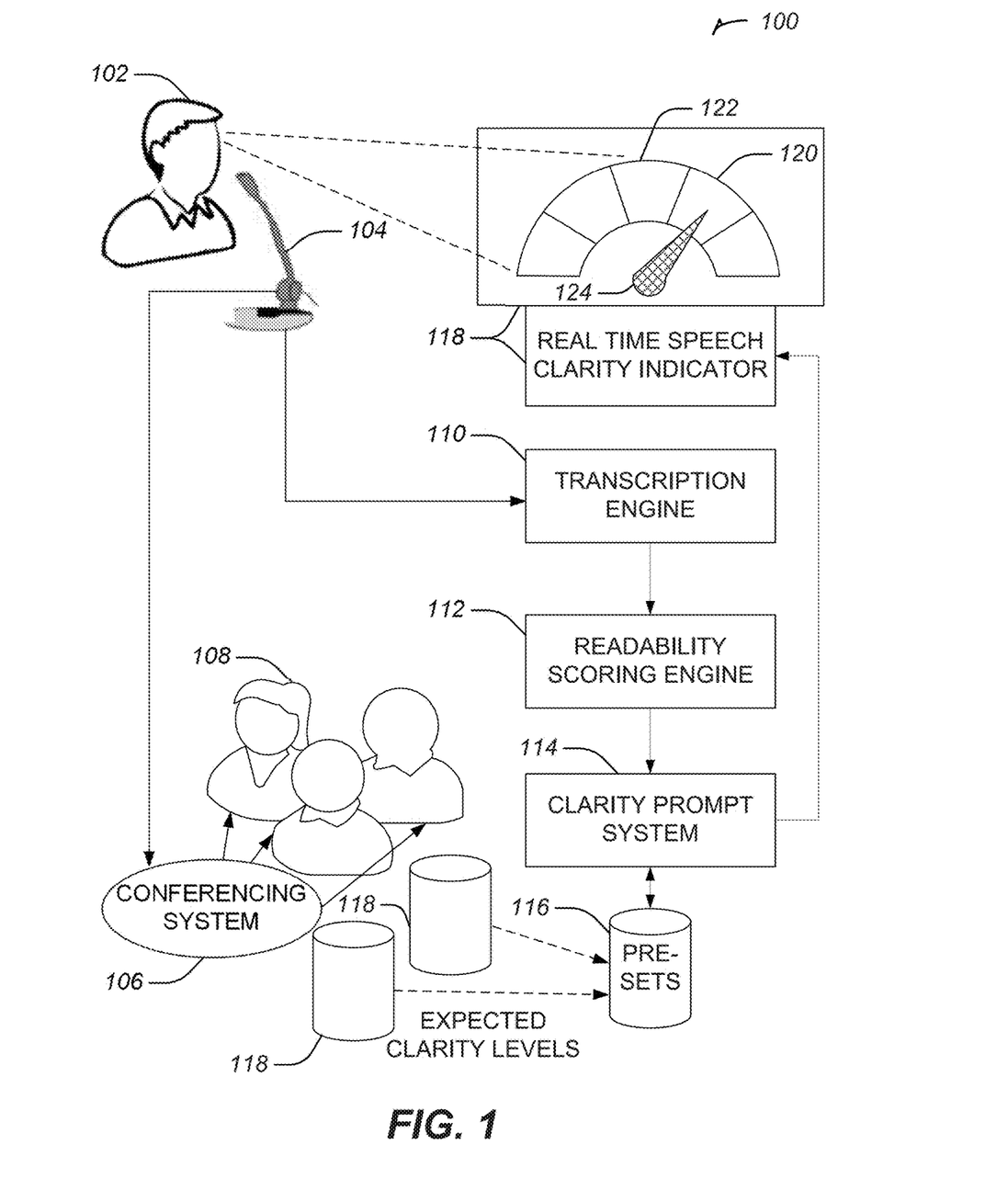
FIG. 1 illustrates a block diagram showing a real time speech clarity indicator in accordance with some embodiments.

FIG. 1 illustrates a block diagram 100 showing a real time speech clarity indicator 118 in accordance with some embodiments. The real time speech clarity indicator 118 may include a plurality of categories, broken up into sections (e.g., sections 120 and 122). A pointer 124 may be used in the real time speech clarity indicator 118 to mark a current section (e.g., section 120 as shown in FIG. 1), for indicating a speech clarity level.

In an example, speech transcription and readability scoring engines may be combined to determine a clarity level. The clarity level may be presented to a user 102 in real time during a call. In an example, determining a clarity level may be done on a local device or may be done on a remote server. The clarity level may be presented on the local device to the user 102.

The block diagram 100 includes a user 102 speaking into a microphone 104. The microphone 104 may be connected to, or part of, a computer, mobile device, tablet, etc. The microphone 104 may be used to record speech by the user 102. A computing device may send the recorded speech to a transcription engine 110. The transcription engine 110 may transcribe the recorded speech to text, and send the resulting text to a readability scoring engine 112. The readability scoring engine 112 may determine a readability score, (e.g., readability of the text) and send the result to a clarity prompt system 114. The clarity prompt system 114 may query a database 116 with preset thresholds or preset ranges and determine a range or value to send to the real time speech clarity indicator 118. For example, the readability scoring engine 112 may determine that the text resulting from transcription of speech at the transcription engine 110 includes a particular level of complexity. The complexity may be compared, using the clarity prompt system 114, to determine that the pointer 124 should indicate section 120 on the real time speech clarity indicator 118, where the section 120 corresponds to the complexity and a preset threshold or range from the database 116. In an example, memory of a device may be used instead of the database 116 for storing the preset thresholds or preset ranges.

In another example, the database 116 may include a maximum tolerated complexity (e.g., a maximum grade level or scoring level for the text). When the maximum tolerated complexity is exceeded, the real time speech clarity indicator 118 may indicate this by moving the pointer 124 to the extreme right. In another example, the real time speech clarity indicator 118 may issue an alert, such as an audible alarm, a flashing light, a pop-up message, or the like.

In yet another example, the database 116 may receive thresholds from the listeners 108 (or a single listener) and designate the sections (e.g., 120 and 122) based on the received thresholds. The thresholds may include expected clarity levels 118 for the listeners 108 (or individual listeners). For example, the clarity prompt system 114 may determine the lowest of the received thresholds of the expected clarity levels 118 in the database 116, and set that as a maximum threshold (so as to allow the user 102 to communicate effectively with all listeners). In another example, the clarity prompt system 114 may determine an average threshold or a weighted average threshold from among the received thresholds of the expected clarity levels 118 or from predetermined thresholds.

The microphone 104 (or a computing device) may send the speech to a conferencing system 106. The conferencing system 106 may make the speech available for, or play the speech to, listeners 108 of the conferencing system 106. The speech played or made available for the listeners 108 may be simultaneously or substantially simultaneously sent to the transcription engine 110 for ultimately determining a real time speech clarity indication.

In an example the transcription engine 110 may include a software or hardware engine able to translate speech into text, for example using an audio digital signal processing module for speech transcription. The readability scoring engine 112 may include a technique for metering text readability. For example, several techniques may be implemented, individually or in combination, such as a Coleman-Liau Index, an Accelerated Reader ATOS, a Dale-Chall Readability Formula, a Simple Measure of Gobbledygook (SMOG), Flesch-Kincaid readability test, or the like. The readability scoring engine 112 may use statistical average, maximum word length in syllables, letters, sentence length, appearance of special words, foreign words, etc. for determining a readability score. The score determined by the readability scoring engine 112 may be compared with scales based on judged linguistic difficulty or reading grade level at the clarity prompt system 114. For example, a grade-level score may be determined for text, (e.g., text is readable at a fourth grade level).

The results of the readability scoring engine 112 and the clarity prompt system 114 may be output to the user 102, such as using a graphical user interface of a display. The graphical user interface may display results illustrating readability calculated for a specific fragment of text or speech. The results may include an explanation of the score or grade level. The results may be presented using a score, range, or level. For example, the results may include a Flesch Reading Ease score (e.g., 66.7 or 'standard/average'), a Gunning Fog score (e.g., 11 or 'hard to read'), a grade level (e.g., 'grade 8' or 'high school graduate grade level'), or the like. In another example, a quantitative score, a qualitative score, or both may be displayed.

Figure 2:
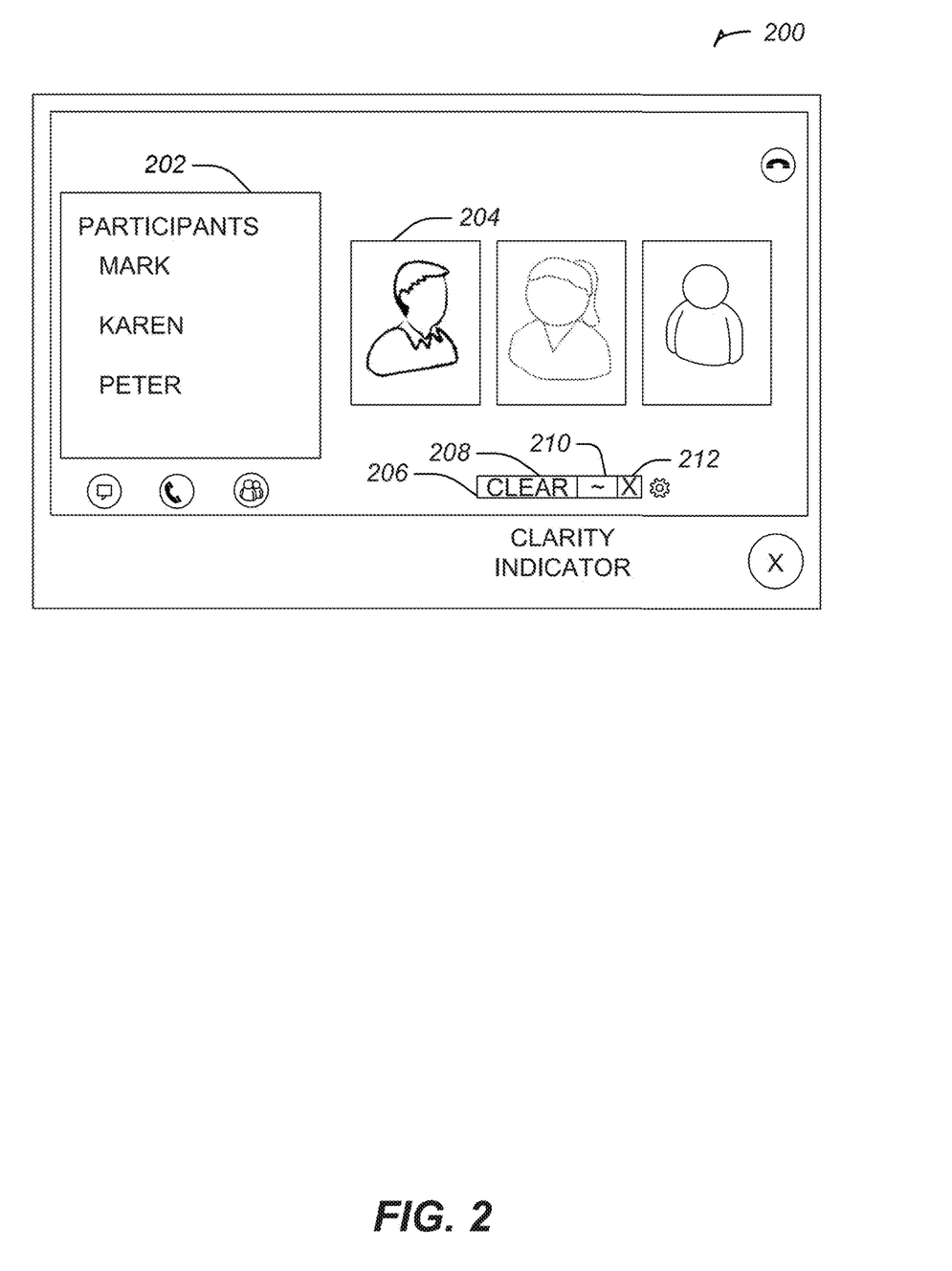
FIG. 2 illustrates a conference call user interface including a clarity indicator in accordance with some embodiments.

FIG. 2 illustrates a user interface 200 including a clarity indicator 206 in accordance with some embodiments. The clarity indicator 206 includes a plurality of indicator sections (208-212), which may be illuminated, highlighted, or otherwise indicated by the user interface 200. For example, section 208 indicates clear speech, section 210 indicates a speech level that is in a warning range, and section 212 indicates a speech level that exceeds a comprehensibility threshold. The user interface 200 may include a list of participants 202 or participant images (e.g., 204), either of which may highlight or indicate a currently speaking participant. For example, participant image 204 may indicate that a corresponding participant is speaking and the clarity indicator 206 may be displayed for that participant. In another example, the clarity indicator 206 may be displayed for all participants, and may be dormant when the respective participant is silent or may display a clarity level for a currently speaking participant. In yet another example, the clarity indicator 206 may be displayed for a leader or host of a conference call.

Before the conference call is initiated, a speaker may specify a grade or reading ease score for the conference call. The grade or score may depend on expected education levels of participants, technical expertise of participants, years of experience in the domain of participants, or the like. After the conference call starts, the speaker's audio may be captured and automatically transcribed. The transcribed audio may be run through a readability score engine, and the result may be shown using the user interface 200, such as on the clarity indicator 206. In an example, when a calculated score exceeds a pre-defined threshold, the speaker may be prompted using a beep, a blink, or another disruptive indication on the user interface 200.

In an example, the user interface may be used in an in-person presentation, such as a meeting or lecture. Aspects of the user interface 200 may be modified or eliminated and other aspects may be added, such as not showing participant images or the list of participants 202. In another example, a threshold may be set as a minimum threshold. The minimum threshold may be used to alert a presenter when speech falls below the minimum threshold. This may be used, for example, when a speaker is discussing a technical field with a sophisticated audience. When speech falls below the minimum threshold, the user interface 200 may issue an alert indicating that the presenter should increase complexity of the presentation. For example, if an alert is issued, the presenter may skip ahead in a presentation to more complex material (e.g., if participants are bored with an introduction, the presenter may skip to later portions of the presentation and go more in depth). In another example, a politician may use the user interface 200 to target a speech to a specific grade level or complexity level by using a minimum threshold (and potentially a maximum threshold as well, for a target range).

Figure 3:
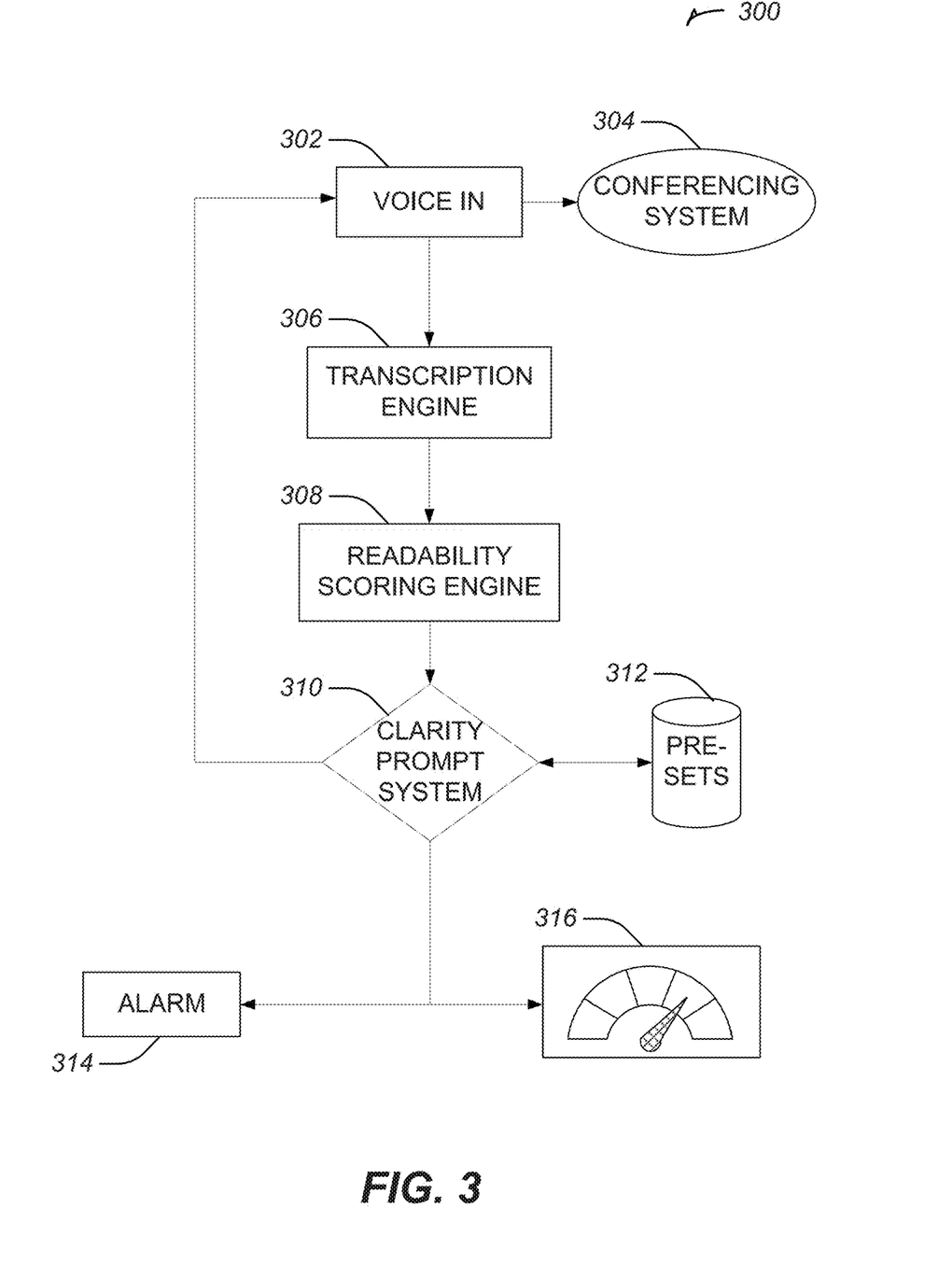
FIG. 3 illustrates a block diagram showing a flow chart for generating a clarity alarm in accordance with some embodiments.

FIG. 3 illustrates a block diagram showing a flow chart 300 for generating a clarity alarm in accordance with some embodiments. The flowchart 300 includes receiving audio at block 302 (e.g., a voice input). When the audio is received, it may be sent to a conferencing system 304 to play for other participants. The audio may be sent to a transcription engine 306 simultaneously or substantially simultaneously. The transcription engine 306 may be used to transcribe the audio to text and send to a readability scoring engine 308. The readability scoring engine 308 may determine a readability score for the text. The score may be sent to a clarity prompt system 310. The clarity prompt system 310 may determine, such as by using presets stored in a database 312 or memory of a device, whether the score exceeds a threshold. When the score exceeds the threshold, the clarity prompt system 310 may initiate an alarm 314. The alarm 314 may alert a user that the user is speaking at a level exceeding the threshold. In another example, the clarity prompt system 310 may send the score to be displayed as a representation of the readability score on the clarity indicator 316. In another example, the clarity indicator 316 and the alarm 314 may be presented concurrently.

As mentioned above, the flow chart 300 may rely only on local inputs at a device. Additional benefits may be obtained by connecting other participants. For example, other participants may advertise respective readability expectations.

The clarity prompt system 310 may use the expectations to automatically adjust the clarity indicator 316 or a threshold to initiate the alarm 314. For example, the clarity prompt system 310 may attempt to set a threshold to meet expectations of a least skilled or average session participant.

Figure 4:
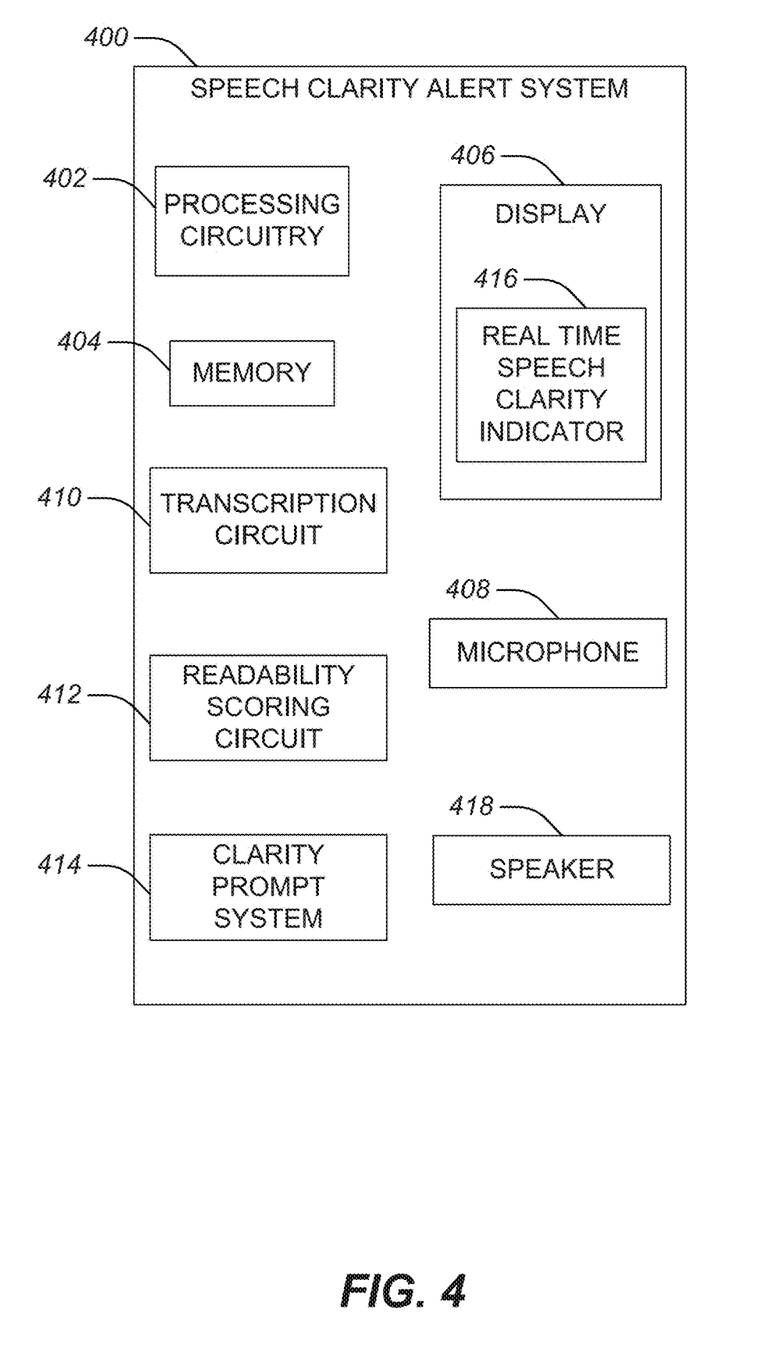
FIG. 4 illustrates a speech clarity alert system in accordance with some embodiments.

FIG. 4 illustrates a speech clarity alert system 400 in accordance with some embodiments. The speech clarity alert system 400 may include processing circuitry 402, memory 404, a display 406, a microphone 408, or a speaker 418. The speech clarity alert system 400 may include a transcription circuit 410, a readability scoring circuit 412, or a clarity prompt system 414. In another example, these components may be located at a remote device. The transcription circuit 410, the readability scoring circuit 412, or the clarity prompt system 414 may include a combination of hardware and software. The processing circuitry 402 may be used to control the transcription circuit 410, the readability scoring circuit 412, or the clarity prompt system 414. The display 406 may include a real time speech clarity indicator 416.

In an example, the microphone 408 is used to record audio from a user, including speech of the user. The audio may be stored in the memory 404. The transcription circuit 410 may transcribe the audio to text. The readability scoring circuit 412 may determine a readability score of the text. The clarity prompt system 414 may determine whether the score exceeds a threshold. The processing circuitry 402 may control the transcription circuit 410, the readability scoring circuit 412, or the clarity prompt system 414, and may prepare the real time speech clarity indicator 416 for display on the display 406. In another example, the processing circuitry 402 can receive an alert from the clarity prompt system 414 if a level of text from audio exceeds a threshold. The processing circuitry can cause the alert to be displayed or output using the display 406 (e.g., flashing the display or displaying text) or the speaker 418 (e.g., playing a beep or other noise to signal the alert).

In an example, the speech clarity alert system 400 may include a machine learning component. The machine learning component may automatically detect speech by a participant (other than a presenter) that indicates a misunderstanding or a lack of understanding. For example, the machine learning component may determine that one of various predetermined phrases or word combinations has been uttered by a participant, such as "I didn't get that," "I didn't catch that," "what?," "could you repeat that," "huh?," "sorry, what was that," or the like. When the machine learning component determines that a participant did not understand or misunderstood the presenter, the machine learning component may save a previous period of speech for analyzing. The previous period of speech may include 10 seconds or the like, or may go back to when the presenter started a segment of speech. The machine learning component may run on a local system or a remote device. The machine learning component may develop text from the misunderstood or not understood audio and compile that text with text from previously misunderstood or not understood audio. Over time, the machine learning component may develop phrases or words that are commonly misunderstood or not understood. When one of those words or phrases is uttered by a presenter in the future, the processing circuitry 402 may alert the presenter that the words or phrases were likely misunderstood or not understood. The alert process of a machine learning protocol may be done in real time and the learning portion of a machine learning protocol may be done offline.

In another example, the processing circuitry 402 may determine a words per minute speed of the speech using the audio and a clock. The words per minute speed may be used to change the real time speech clarity indicator 416, or to display an alert on the display 406 or sound an alert on the speaker 418, such as when the words per minute speed of the speech exceeds a maximum speed threshold. The maximum speed threshold may be based on predetermined metrics or determined using call participant language skills.

In yet another example, the processing circuitry 402 may receive an indication from a presenter, the indication specifying a spoken language for the audio and a native language for the presenter. For example, the presenter may indicate that the audio is in English and the presenter's native language is French. This may be used to affect the real time speech clarity indicator 416 or alerts that may be displayed on the display 406 or using the speaker 418. In the example above, the processing circuitry 402 may use a lower threshold for clarity to alert the presenter that the speech may be incomprehensible. In another example, if the presenter's native language is the same as the spoken language, the threshold may be set higher. In yet another example, the input audio and native languages may be used to configure the transcription circuit 410, the readability scoring circuit 412, or the clarity prompt system 414 (e.g., by downloading a dictionary or rules for the specified language in advance of the call).

The processing circuitry 402 may receive an indication from a participant of a call indicating the participant's native language. The indication from the participant may be used with an indication received from a presenter indicating a spoken language or a native language, or the indication from the participant may be used independently. For example, the participant's native language may be used to lower a threshold for clarity at the clarity prompt system 414 when the participant's native language differs from a spoken language (e.g., determined from the spoken audio automatically or determined from the presenter's indicated spoken language). In another example, a presenter may indicate a native language of English and a spoken language for the audio of French. The processing circuitry 402 may receive indications from participants indicating native languages of French. In this example, the display 406 may display a suggestion to the presenter to speak in French because French is the native language of the presenter and the participants, so that the presenter will be better understood by the participants. In another example, the display 406 may suggest the change in language when the real time speech clarity indicator 416 repeatedly or consistently displays a low speech clarity (e.g., the speech clarity repeatedly or consistently falls below a threshold).

Figure 5:
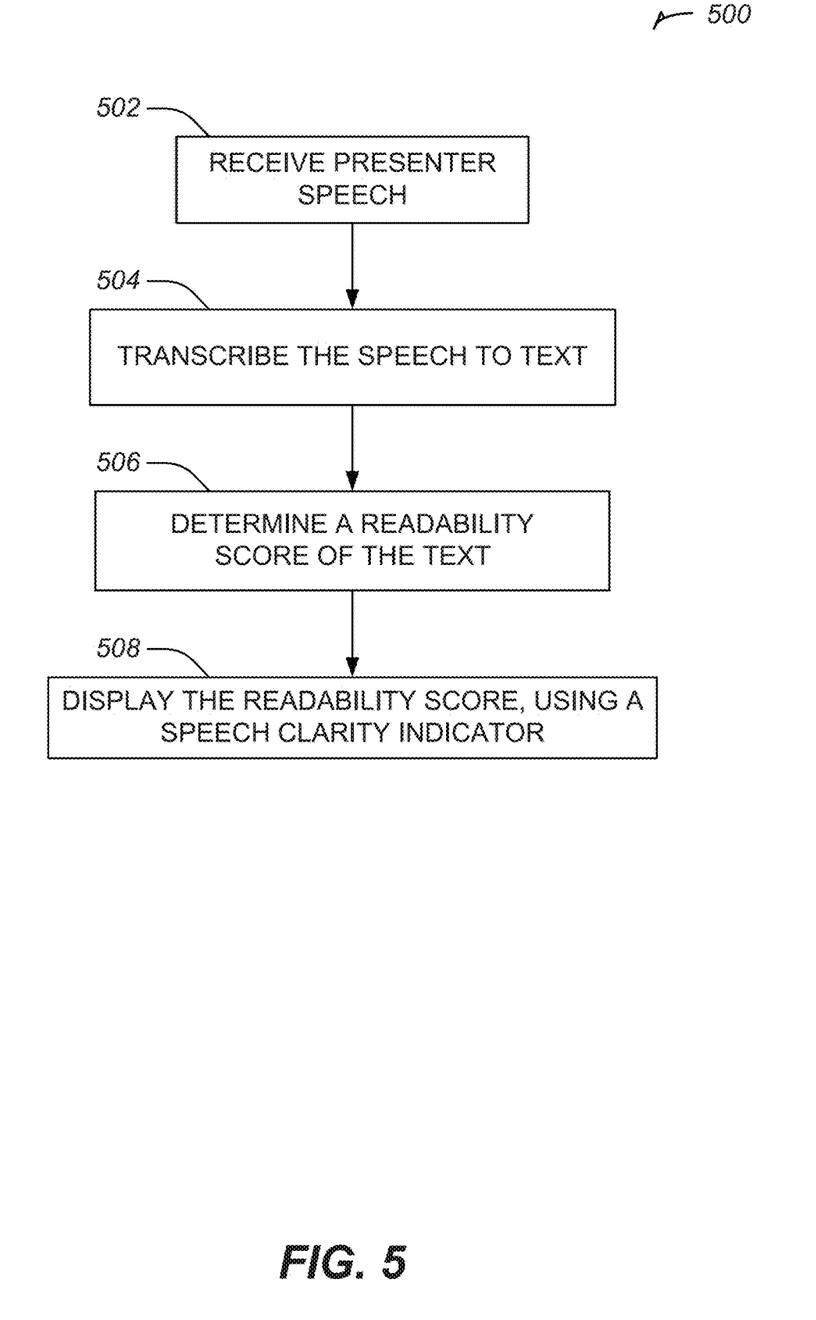
FIG. 5 illustrates a flowchart showing a technique for presenting a speech clarity indicator in accordance with some embodiments.

FIG. 5 illustrates a flowchart showing a technique 500 for presenting a speech clarity indicator in accordance with some embodiments. The technique 500 may be used to improve speech clarity for participants in a conference call or at a presentation. The technique 500 includes an operation 502 to receive presenter speech from a presenter to be cast to one or more participants in a conference call. The speech may be received from a microphone, such as a microphone coupled to a device or embedded in the device. The microphone may record the speech. The speech may be recorded during a telephone conference call.

The technique 500 includes an operation 504 to transcribe the speech to text. The speech may be transcribed using a transcription engine of the device. The technique 500 includes an operation 506 to determine a readability score of the text. The readability score may be determined by a readability engine of the device. Determining the readability score may include determining a Flesch-Kincaid grade level score.

The technique 500 includes an operation 508 to display the readability score, using a speech clarity indicator, to the presenter used as a metric to gauge participants' understanding. In an example, the speech clarity indicator includes a range of levels and a pointer indicating a level of the range of levels, the level corresponding to the readability score. In another example, displaying the speech clarity indicator may include displaying a representation of the readability score. The representation may include a qualitative statement of readability or a quantitative value of readability. In yet another example, displaying the speech clarity indicator may include automatically updating the speech clarity indicator in real time based on an updated determined readability score (e.g., when the presenter continues to speak).

In another example, the technique 500 includes an operation to alert a presenter that the readability score exceeds a threshold. The threshold may include a threshold predetermined by the presenter. In another example, the threshold may be determined based on language skills of call participants (e.g., one or more participants of a conference call). In yet another example, the threshold may be based on a lowest score or an average score from the language skills of call participants (e.g., one or more participants of a conference call). In an example, the threshold may include a maximum reading level or a words per minute speed of the speech.

The technique 500 may include an operation to receive an indication from the presenter, the indication specifying a spoken language for the audio and a native language for the presenter. In an example, the device may be a conference call telephone. In another example, the device may be a computer. In yet another example, the device may be a mobile device.

Figure 6:
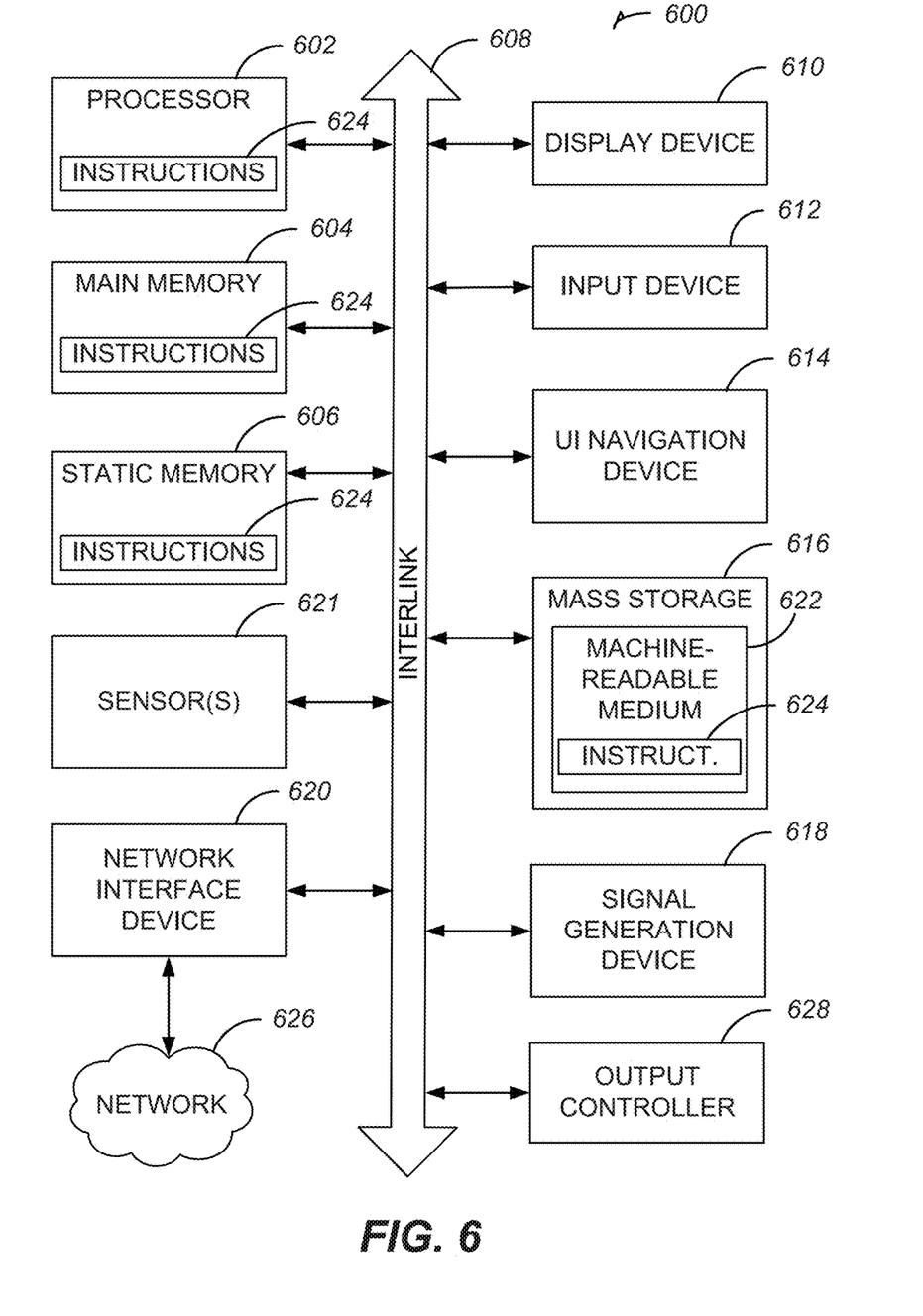
FIG. 6 illustrates generally an example of a block diagram of a machine upon which any one or more of the techniques (e.g., methodologies) discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a system for improving speech clarity for participants in a conference call, the system comprising: a microphone to receive presenter speech from a presenter to be cast to one or more participants in a conference call; a transcription circuit communicably connected to the microphone to transcribe the speech to text; a readability scoring circuit to determine a readability score of the text; and a display to display the readability score, using a speech clarity indicator, to the presenter used as a metric to gauge participants' understanding.

In Example 2, the subject matter of Example 1 optionally includes wherein to determine the readability score, the readability scoring circuit is to determine a Flesch-Kincaid grade level score.

In Example 3, the subject matter of any one or more of Examples 1-2 optionally include wherein the transcription circuit is further to receive an indication from the presenter, the indication specifying a spoken language for the audio and a native language for the presenter.

In Example 4, the subject matter of any one or more of Examples 1-3 optionally include wherein to the speech clarity indicator includes a range of levels and a pointer indicating a level of the range of levels, the level corresponding to the readability score.

In Example 5, the subject matter of any one or more of Examples 1-4 optionally include wherein to display the readability score, the display is to display a representation of the readability score.

In Example 6, the subject matter of Example 5 optionally includes wherein the representation is a qualitative statement of readability.

In Example 7, the subject matter of any one or more of Examples 5-6 optionally include wherein the representation is a quantitative value of readability.

In Example 8, the subject matter of any one or more of Examples 1-7 optionally include wherein to display the readability score, the display is to automatically update the speech clarity indicator in real time based on an updated determined readability score determined by the readability scoring circuit.

In Example 9, the subject matter of any one or more of Examples 1-8 optionally include wherein the display is to alert the presenter when the readability score exceeds a threshold.

In Example 10, the subject matter of Example 9 optionally includes wherein the threshold is predetermined by the presenter.

In Example 11, the subject matter of any one or more of Examples 9-10 optionally include wherein the threshold is determined based on language skills of the one or more participants.

In Example 12, the subject matter of Example 11 optionally includes wherein the threshold is based on a lowest score or an average score from the language skills of the one or more participants.

In Example 13, the subject matter of any one or more of Examples 9-12 optionally include wherein the threshold is a maximum reading level.

In Example 14, the subject matter of any one or more of Examples 9-13 optionally include wherein the threshold is a words per minute speed of the speech.

In Example 15, the subject matter of any one or more of Examples 1-14 optionally include wherein the system is a conference call telephone.

Example 16 is a method for improving speech clarity for participants in a conference call, the method comprising: receiving presenter speech from a presenter to be cast to one or more participants in a conference call; transcribing the speech to text; determining a readability score of the text; and displaying the readability score, using a speech clarity indicator, to the presenter used as a metric to gauge participants' understanding.

In Example 17, the subject matter of Example 16 optionally includes wherein determining the readability score includes determining a Flesch-Kincaid grade level score.

In Example 18, the subject matter of any one or more of Examples 16-17 optionally include receiving an indication from the presenter, the indication specifying a spoken language for the audio and a native language for the presenter.

In Example 19, the subject matter of any one or more of Examples 16-18 optionally include wherein the speech clarity indicator includes a range of levels and a pointer indicating a level of the range of levels, the level corresponding to the readability score.

In Example 20, the subject matter of any one or more of Examples 16-19 optionally include wherein displaying the readability score includes displaying a representation of the readability score.

In Example 21, the subject matter of Example 20 optionally includes wherein the representation is a qualitative statement of readability.

In Example 22, the subject matter of any one or more of Examples 20-21 optionally include wherein the representation is a quantitative value of readability.

In Example 23, the subject matter of any one or more of Examples 16-22 optionally include wherein displaying the readability score includes automatically updating the speech clarity indicator in real time based on an updated determined readability score.

In Example 24, the subject matter of any one or more of Examples 16-23 optionally include alerting the presenter when the readability score exceeds a threshold.

In Example 25, the subject matter of Example 24 optionally includes wherein the threshold is predetermined by the presenter.

In Example 26, the subject matter of any one or more of Examples 24-25 optionally include wherein the threshold is determined based on language skills of the one or more participants.

In Example 27, the subject matter of Example 26 optionally includes wherein the threshold is based on a lowest score or an average score from the language skills of the one or more participants.

In Example 28, the subject matter of any one or more of Examples 24-27 optionally include wherein the threshold is a maximum reading level.

In Example 29, the subject matter of any one or more of Examples 24-28 optionally include wherein the threshold is a words per minute speed of the speech.

In Example 30, the subject matter of any one or more of Examples 16-29 optionally include wherein the readability score is displayed on a conference call telephone.

Example 31 is at least one machine-readable medium including instructions for operation of a computing system, which when executed by a machine, cause the machine to perform operations of any of the methods of Examples 16-30.

Example 32 is an apparatus comprising means for performing any of the methods of Examples 16-30.

Example 33 is at least one machine-readable medium including instructions for operation of a computing system, which when executed by a machine, cause the machine to: receive presenter speech from a presenter to be cast to one or more participants in a conference call; transcribe the speech to text; determine a readability score of the text; and display the readability score, using a speech clarity indicator, to the presenter used as a metric to gauge participants' understanding.

In Example 34, the subject matter of Example 33 optionally includes wherein to determine the readability score includes to determine a Flesch-Kincaid grade level score.

In Example 35, the subject matter of any one or more of Examples 33-34 optionally include instructions to receive an indication from the presenter, the indication specifying a spoken language for the audio and a native language for the presenter.

In Example 36, the subject matter of any one or more of Examples 33-35 optionally include wherein the speech clarity indicator includes a range of levels and a pointer indicating a level of the range of levels, the level corresponding to the readability score.

In Example 37, the subject matter of any one or more of Examples 33-36 optionally include wherein to display the readability score includes to display a representation of the readability score.

In Example 38, the subject matter of Example 37 optionally includes wherein the representation is a qualitative statement of readability.

In Example 39, the subject matter of any one or more of Examples 37-38 optionally include wherein the representation is a quantitative value of readability.

In Example 40, the subject matter of any one or more of Examples 33-39 optionally include wherein to display the readability score includes to automatically update the speech clarity indicator in real time based on an updated determined readability score.

In Example 41, the subject matter of any one or more of Examples 33-40 optionally include instructions to alert the presenter when the readability score exceeds a threshold.

In Example 42, the subject matter of Example 41 optionally includes wherein the threshold is predetermined by the presenter.

In Example 43, the subject matter of any one or more of Examples 41-42 optionally include wherein the threshold is determined based on language skills of the one or more participants.

In Example 44, the subject matter of Example 43 optionally includes wherein the threshold is based on a lowest score or an average score from the language skills of the one or more participants.

In Example 45, the subject matter of any one or more of Examples 41-44 optionally include wherein the threshold is a maximum reading level.

In Example 46, the subject matter of any one or more of Examples 41-45 optionally include wherein the threshold is a words per minute speed of the speech.

In Example 47, the subject matter of any one or more of Examples 33-46 optionally include wherein the machine is a conference call telephone.

Example 48 is an apparatus for improving speech clarity for participants in a conference call, the apparatus comprising: means for receiving presenter speech from a presenter to be cast to one or more participants in a conference call; means for transcribing the speech to text; means for determining a readability score of the text; and means for displaying the readability score, using a speech clarity indicator, to the presenter used as a metric to gauge participants' understanding.

In Example 49, the subject matter of Example 48 optionally includes wherein the means for determining the readability score include means for determining a Flesch-Kincaid grade level score.

In Example 50, the subject matter of any one or more of Examples 48-49 optionally include means for receiving an indication from the presenter, the indication specifying a spoken language for the audio and a native language for the presenter.

In Example 51, the subject matter of any one or more of Examples 48-50 optionally include wherein the speech clarity indicator includes a range of levels and a pointer indicating a level of the range of levels, the level corresponding to the readability score.

In Example 52, the subject matter of any one or more of Examples 48-51 optionally include wherein the means for displaying the readability score include means for displaying a representation of the readability score.

In Example 53, the subject matter of Example 52 optionally includes wherein the representation is a qualitative statement of readability.

In Example 54, the subject matter of any one or more of Examples 52-53 optionally include wherein the representation is a quantitative value of readability.

In Example 55, the subject matter of any one or more of Examples 48-54 optionally include wherein the means for displaying the readability score include means for automatically updating the speech clarity indicator in real time based on an updated determined readability score.

In Example 56, the subject matter of any one or more of Examples 48-55 optionally include means for alerting the presenter when the readability score exceeds a threshold.

In Example 57, the subject matter of Example 56 optionally includes wherein the threshold is predetermined by the presenter.

In Example 58, the subject matter of any one or more of Examples 56-57 optionally include wherein the threshold is determined based on language skills of the one or more participants.

In Example 59, the subject matter of Example 58 optionally includes wherein the threshold is based on a lowest score or an average score from the language skills of the one or more participants.

In Example 60, the subject matter of any one or more of Examples 56-59 optionally include wherein the threshold is a maximum reading level.

In Example 61, the subject matter of any one or more of Examples 56-60 optionally include wherein the threshold is a words per minute speed of the speech.

In Example 62, the subject matter of any one or more of Examples 48-61 optionally include wherein the apparatus is a conference call telephone.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for improving speech clarity for participants in a conference call, the system comprising:
   a microphone;
   a display;
   at least one processor; and
   memory including instructions that, when executed by the at least one processor, cause the at least one processor to:
   receive, from the microphone, presenter speech from a presenter to be cast to one or more participants in a conference call;
   transcribe the speech to text;
   determine a readability score of the text, wherein the readability score indicates the readability of the speech; and
   display, with a speech clarity indicator, the readability score to the presenter, wherein the speech clarity indicator displays an alert when a words-per-minute speed of the speech exceeds a words-per-minute threshold.

2. The system of claim 1, wherein to determine the readability score, the instructions further include to determine a Flesch-Kincaid grade level score.

3. The system of claim 1, wherein the instructions further include to receive an indication from the presenter, the indication specifying a spoken language for the audio and a native language for the presenter.

4. The system of claim 1, wherein to the speech clarity indicator includes a range of levels and a pointer indicating a level of the range of levels, the level corresponding to the readability score.

5. The system of claim 1, wherein to display the readability score, the display is to display a representation of the readability score.

6. The system of claim 5, wherein the representation is a qualitative statement of readability.

7. The system of claim 5, wherein the representation is a quantitative value of readability.

8. The system of claim 1, wherein to display the readability score, the display is to automatically update the speech clarity indicator in real time based on an updated determined readability score.

9. The system of claim 1, wherein the display is to alert the presenter when the readability score exceeds a threshold.

10. The system of claim 9, wherein the threshold is predetermined by the presenter.

11. The system of claim 9, wherein the d is determined based on language skills of the one or more participants.

12. The system of claim 11, wherein the threshold is based on a lowest score or an average score from the language skills of the one or more participants.

13. The system of claim 9, wherein the threshold is a maximum reading level.

14. The system of claim 1, wherein the system is a conference call telephone.

15. A method for improving speech clarity for participants in a conference call, the method comprising:
   receiving presenter speech from a presenter to be cast to one or more participants in a conference call;
   transcribing the speech to text;
   determining a readability score of the text, wherein the readability score indicates the readability of the speech; and
   displaying, with a speech clarity indicator, the readability score to the presenter, wherein the speech clarity indicator displays an alert when a words-per-minute speed of the speech exceeds a words-per-minute threshold.

16. The method of claim 15, wherein determining the readability score includes determining a Flesch-Kincaid grade level score.

17. The method of claim 15, further comprising receiving an indication from the presenter, the indication specifying a spoken language for the audio and a native language for the presenter.

18. The method of claim 15, wherein the speech clarity indicator includes a range of levels and a pointer indicating a level of the range of levels, the level corresponding to the readability score.

19. The method of claim 15, wherein displaying the readability score includes displaying a representation of the readability score.

20. At least one non-transitory machine-readable medium including instructions for operation of a computing system, which when executed by a machine, cause the machine to:
   receive presenter speech from a presenter to be cast to one or more participants in a conference call;
   transcribe the speech to text;
   determine a readability score of the text, wherein the readability score indicates the readability of the speech; and
   display, with a speech clarity indicator, the readability score to the presenter, wherein the speech clarity indicator displays an alert when a words-per-minute speed of the speech exceeds a words-per-minute threshold.

21. The non-transitory machine-readable medium of claim 20, wherein to determine the readability score includes to determine a Flesch-Kincaid grade level score.

22. The non-transitory machine-readable medium of claim 20, further comprising instructions to receive an indication from the presenter, the indication specifying a spoken language for the audio and a native language for the presenter.

23. The non-transitory machine-readable medium of claim 20, wherein the speech clarity indicator includes a range of levels and a pointer indicating a level of the range of levels, the level corresponding to the readability score.

24. The non-transitory machine-readable medium of claim 20, wherein to display the readability score includes to display a representation of the readability score.

* * * * *

UNITED STATES PATENT AND TRADEMARK OFFICE
CERTIFICATE OF CORRECTION

| | | |
|---|---|---|
| PATENT NO. | : 10,522,053 B2 | Page 1 of 1 |
| APPLICATION NO. | : 15/085461 | |
| DATED | : December 31, 2019 | |
| INVENTOR(S) | : Oleg Pogorelik | |

It is certified that error appears in the above-identified patent and that said Letters Patent is hereby corrected as shown below:

In the Claims

In Column 14, Line 20, in Claim 11, delete "d" and insert --threshold-- therefor Signed and Sealed this
Twenty-fourth Day of September, 2024

Katherine Kelly Vidal
*Director of the United States Patent and Trademark Office*